United States Patent
Hui et al.

(10) Patent No.: US 10,038,625 B2
(45) Date of Patent: Jul. 31, 2018

(54) OPTIMIZING BIDIRECTIONAL TRAFFIC FLOWS

(71) Applicant: Cisco Technology, Inc., San Jose, CA (US)

(72) Inventors: Jonathan Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

(*) Notice: Subject to any disclaimer, the term of this patent is extended or adjusted under 35 U.S.C. 154(b) by 327 days.

(21) Appl. No.: 14/549,707

(22) Filed: Nov. 21, 2014

(65) Prior Publication Data

US 2016/0134516 A1    May 12, 2016

Related U.S. Application Data

(60) Provisional application No. 62/076,606, filed on Nov. 7, 2014.

(51) Int. Cl.
| | | |
|---|---|---|
| *H04L 12/707* | (2013.01) | |
| *H04L 12/729* | (2013.01) | |
| *H04W 40/16* | (2009.01) | |
| *H04L 12/721* | (2013.01) | |
| *H04L 12/735* | (2013.01) | |
| *H04L 12/26* | (2006.01) | |
| *H04W 84/18* | (2009.01) | |

(52) U.S. Cl.
CPC ............ *H04L 45/22* (2013.01); *H04L 43/026* (2013.01); *H04L 45/125* (2013.01); *H04L 45/127* (2013.01); *H04L 45/128* (2013.01); *H04W 40/16* (2013.01); *H04L 43/028* (2013.01); *H04L 43/16* (2013.01); *H04W 84/18* (2013.01)

(58) Field of Classification Search
CPC ..... H04L 45/22; H04L 45/125; H04L 45/127; H04L 45/128; H04L 43/056; H04L 43/026
See application file for complete search history.

(56) References Cited

U.S. PATENT DOCUMENTS

| | | | |
|---|---|---|---|
| 9,410,863 B2 * | 8/2016 | Nichols | G01L 25/003 |
| 9,473,412 B2 * | 10/2016 | Hui | H04B 3/542 |
| 9,537,593 B2 * | 1/2017 | Hui | H04L 1/0015 |
| 2009/0232026 A1 * | 9/2009 | Lu | H04L 45/125 370/254 |

(Continued)

OTHER PUBLICATIONS

Winter et al., "RPL: IPv6 Routing Protocol for Low-Power and Lossy Networks", Request for Comments 6550, Mar. 2012, 157 pages, Internet Engineering Task Force Trust.

*Primary Examiner* — Un C Cho
*Assistant Examiner* — Jeremy Costin
(74) *Attorney, Agent, or Firm* — Parker Ibrahim & Berg LLP; James M. Behmke; Stephen D. LeBarron

(57) ABSTRACT

In one embodiment, a device in a network detects a bidirectional traffic flow along a primary path in the network. The device determines that a self-interference condition exists along the primary path. The device selects an alternate path in the network. The device causes the traffic flow to use the primary path for packets of the traffic flow sent in a first direction and to use the alternate path for packets of the traffic flow send in a second direction that is opposite that of the first direction.

21 Claims, 15 Drawing Sheets

(56) References Cited

U.S. PATENT DOCUMENTS

| | | | |
|---|---|---|---|
| 2013/0343174 A1* | 12/2013 | Guichard | H04L 45/22 370/218 |
| 2014/0010072 A1* | 1/2014 | Gandhi | H04L 47/724 370/228 |
| 2014/0064062 A1* | 3/2014 | Taillon | H04L 45/22 370/225 |

* cited by examiner

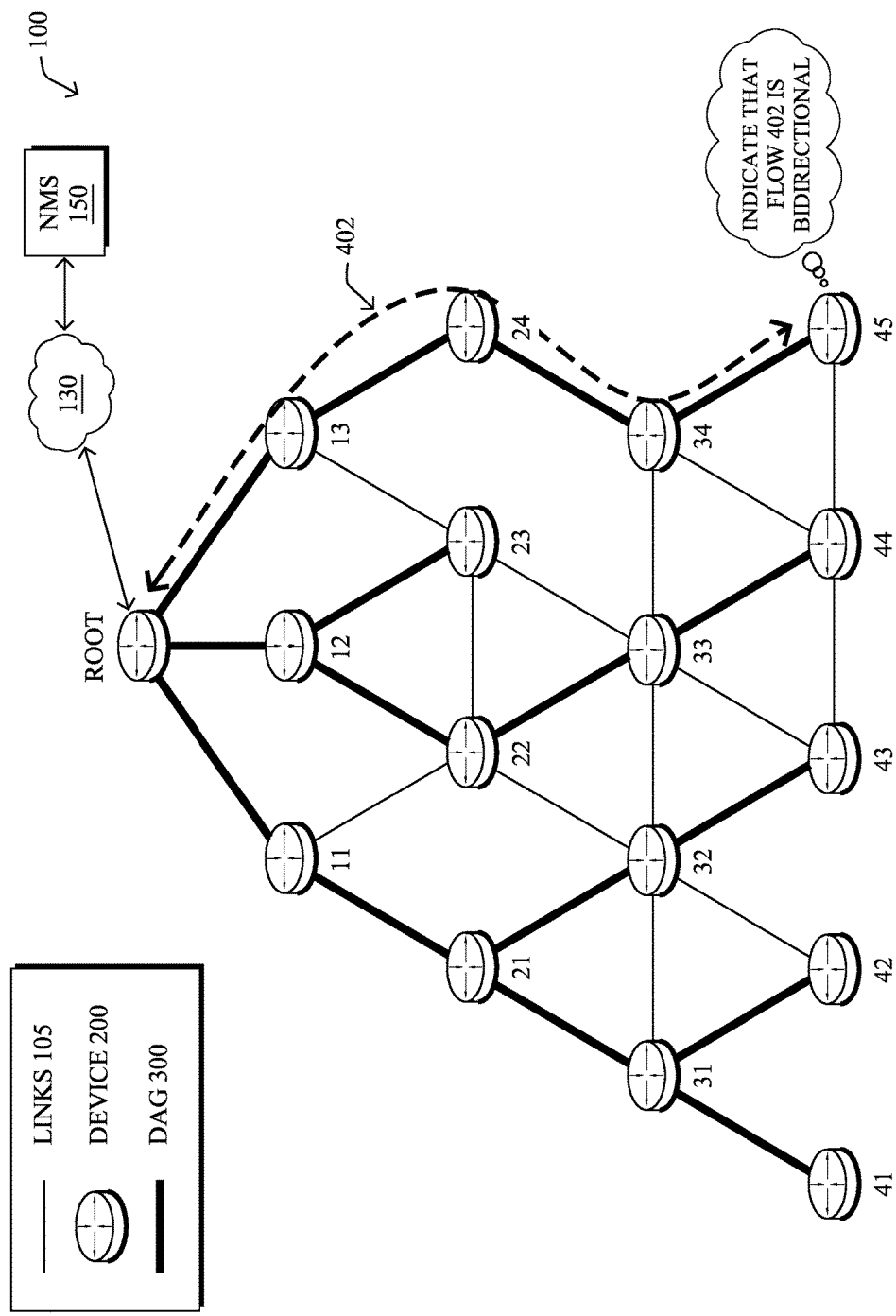

OPTIMIZING BIDIRECTIONAL TRAFFIC FLOWS

RELATED APPLICATIONS

This application claims priority to U.S. Provisional Application No. 62/076,606, filed Nov. 7, 2014, entitled: "OPTIMIZING BIDIRECTIONAL TRAFFIC FLOWS," by Hui et al., the contents of which are herein incorporated by reference.

TECHNICAL FIELD

The present disclosure relates generally to computer networks, and, more particularly, to optimizing bidirectional traffic flows.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

The use of shared-media links in LLNs is not without certain drawbacks. In particular, the very nature of shared-media communication links means an increased risk of interference between devices that are in close proximity with one another (e.g., two devices both attempt to use the same frequency, etc.). Such a condition is sometimes referred to as "self-interference," since the interference is caused by devices that are also members of the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4C illustrate examples of a network device detecting a bidirectional traffic flow;

DESCRIPTION OF EXAMPLE EMBODIMENTS

Overview

According to one or more embodiments of the disclosure, a device in a network detects a bidirectional traffic flow along a primary path in the network. The device determines that a self-interference condition exists along the primary path. The device selects an alternate path in the network. The device causes the traffic flow to use the primary path for packets of the traffic flow sent in a first direction and to use the alternate path for packets of the traffic flow send in a second direction that is opposite that of the first direction.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or power line communication (PLC) links, such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
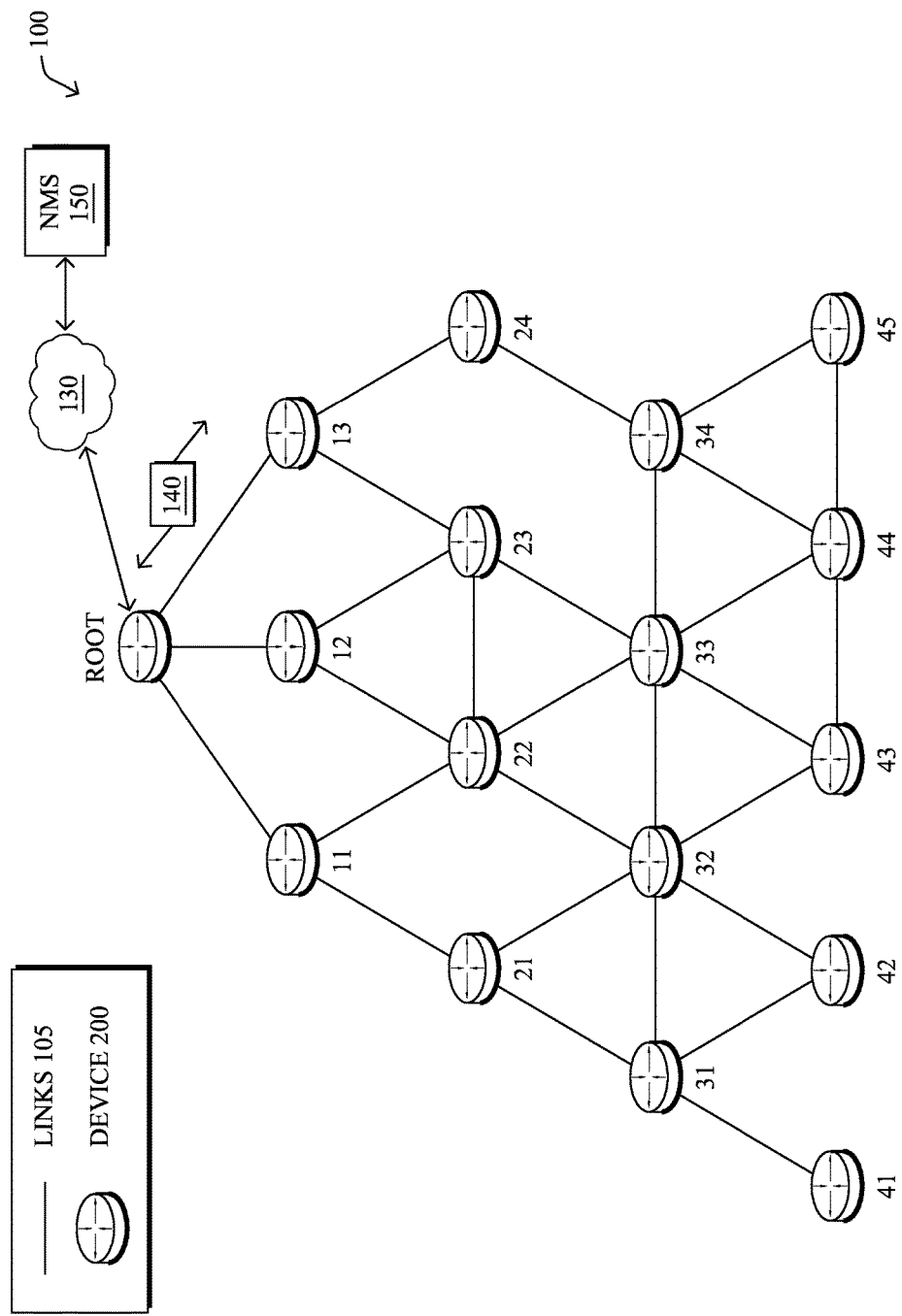
FIG. 1 illustrates an example communication network.

FIG. 1 is a schematic block diagram of an example computer network 100 illustratively comprising nodes/devices 200 (e.g., labeled as shown, a field area router (FAR)/root device "Root," nodes "11," "12," . . . "45," and described in FIG. 2 below) interconnected by various methods of communication. For instance, the links 105 between nodes/devices 200 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. In some implementations, the Root node shown may function as a border router that provides connectivity between the local mesh nodes 11-45 and other networks or devices. For example, the Root node may convey information to and/or from a remote network management system/server (NMS) 150 via a WAN 130. Those skilled in the art will understand that any number of nodes, devices, links, etc. may be used in the computer network, and that the view shown herein is for simplicity. Also, those skilled in the art will further understand that while the network is shown in a certain orientation, particularly with a "Root" node, the network 100 is merely an example illustration that is not meant to limit the disclosure.

s Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
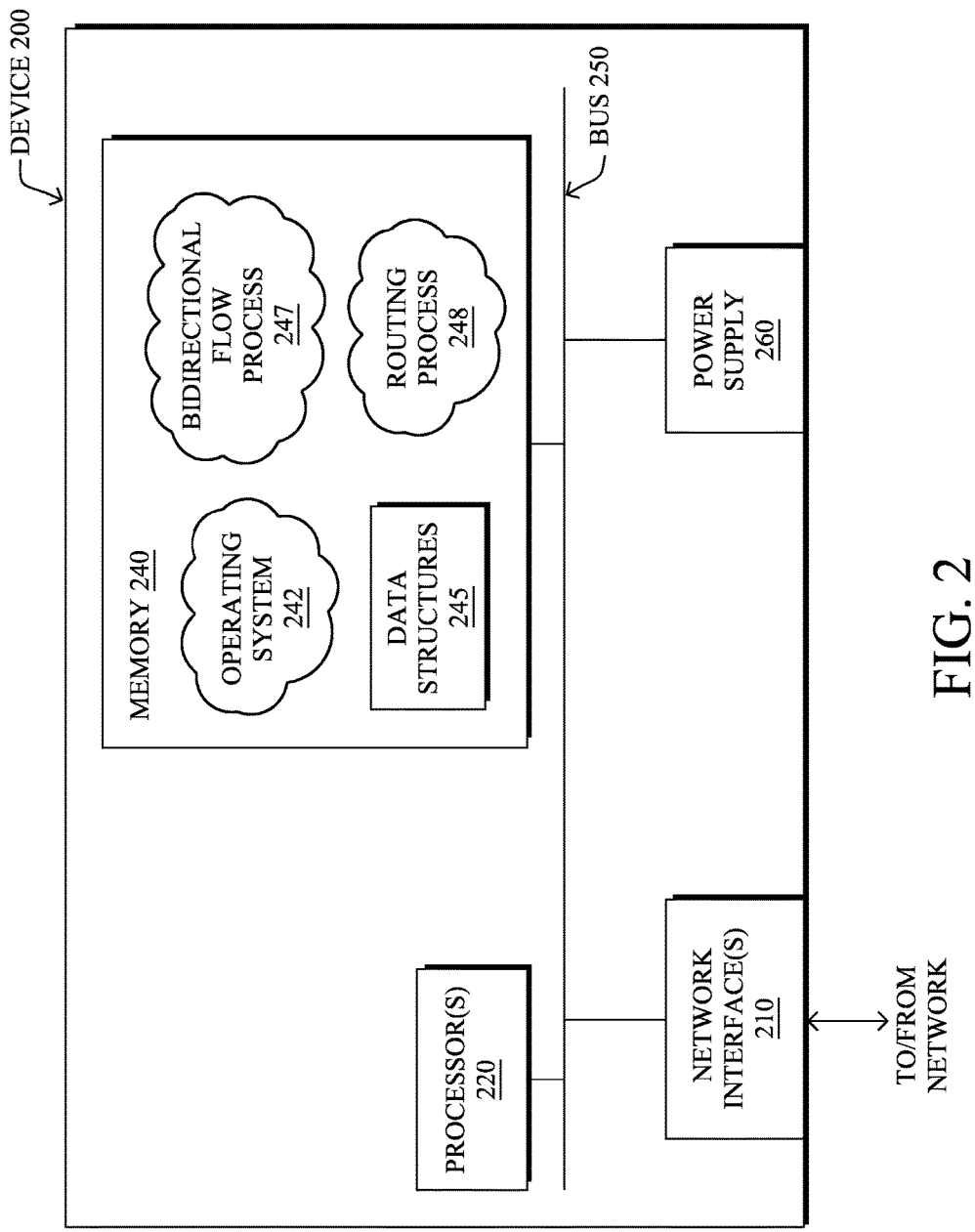
FIG. 2 illustrates an example network device/node.

FIG. 2 is a schematic block diagram of an example node/device 200 that may be used with one or more embodiments described herein, e.g., as any of the nodes shown in FIG. 1 above. The device may include one or more network interfaces 210 (e.g., wired, wireless, PLC, etc.), at least one processor 220, and a memory 240 interconnected by a system bus 250, as well as a power supply 260 (e.g., a battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into power supply 260.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic adapted to execute the software programs and manipulate the data structures 245. An operating system 242, portions of which are typically resident in memory 240 and executed by processor 220, functionally organizes the device by, inter alia, invoking operations in support of software processes and/or services executing on the device. These software processes and/or services may include routing process/services 248 and a bidirectional flow process 247, as described herein. Note that while processes 247-248 are shown in centralized memory 240, alternative embodiments provide for the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 248 includes computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) including, e.g., data used to make routing/forwarding decisions. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from LLN devices towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 248) based on an objective function (OF). The role of the OF is generally to specify rules on how to build the DAG (e.g. number of parents, backup parents, etc.).

Figure 3:
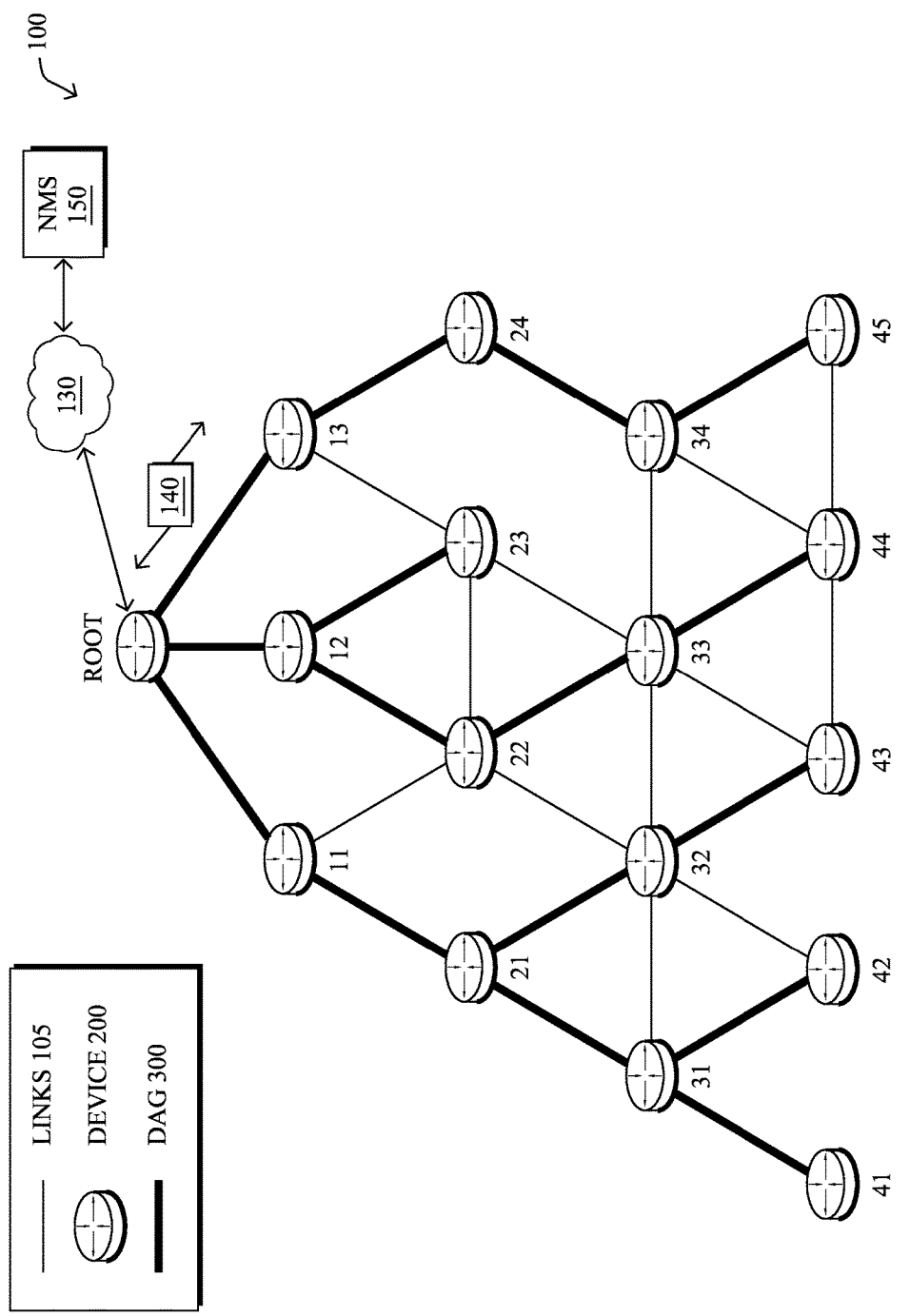
FIG. 3 illustrates an example directed acyclic graph (DAG) in the communication network of FIG. 1.

FIG. 3 illustrates an example DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 300 (shown as bolded lines), which extends from the Root node toward one or more leaf nodes (nodes without children). Traffic/packets 140 (shown in FIG. 1) may then traverse DAG 300 in either the upward direction toward the root or downward toward the leaf nodes, particularly as described herein.

As noted previously, link technologies common to LLN deployments typically use shared communication media (e.g., shared PLC links, shared wireless channels, etc.). For this reason, communication between different pairs of devices within physical proximity may interfere with each other, leading to a condition referred to as self-interference (e.g., as opposed to interference caused by conditions external to the network).

Self-interference can occur in several ways within a multichannel system. In one case, two devices transmitting simultaneously on the same channel can cause a collision at the receiver. In another case, because typical link technologies are half-duplex, a device cannot transmit and receive at the same time, even when communication occurs on different channels. As a result, self-interference can occur even when communicating multiple packets along a single path. For example, as shown in FIG. 3, node 45 may not be able to send a packet to node 34 at the same time that node 34 is communicating with node 24. This type of situation is sometimes referred to as a hidden-terminal problem, since communications involving node 24 may be "hidden" from node 45 (e.g., node 24 is outside of the range of node 45).

Bidirectional flows in a shared-media network may present additional challenges with respect to self-interference. In particular, transmitting packets in two different directions along a single path may cause significant self-interference and exacerbates the effects of half-duplex communication that are susceptible to the hidden-terminal problem. When communicating packets in a single direction, one possible method to avoid self-interference is for devices to perform traffic-shaping by waiting for a period of time between each packet transmission, allowing downstream devices to forward packets. However, when communicating packets in both directions, this technique is no longer applicable, as a node along the path may not have information regarding when upstream and downstream packets will cross.

Optimizing Bidirectional Traffic Flows

The techniques herein provide for the optimization of bidirectional flows in mesh networks, such as Smart Grid AMI mesh networks. In some aspects, a device in a mesh network may dynamically detect bidirectional traffic flows. If a detected bidirectional flow is causing, or is likely to cause, self-interference, the flow may be divided such that traffic in one direction is routed along a first path and the corresponding traffic in the opposite direction is routed along a different path. By using asymmetric routing paths that are partially or fully diverse from one another, a self-interference condition may be mitigated or avoided entirely.

Specifically, according to one or more embodiments of the disclosure as described in detail below, a device in a network detects a bidirectional traffic flow along a primary path in the network. The device determines that a self-interference condition exists along the primary path. The device selects an alternate path in the network. The device causes the traffic flow to use the primary path for packets of the traffic flow sent in a first direction and to use the alternate path for packets of the traffic flow send in a second direction that is opposite that of the first direction.

Illustratively, the techniques described herein may be performed by hardware, software, and/or firmware, such as in accordance with the bidirectional flow process 247 executed by a device 200, which may include computer executable instructions executed by the processor 220 (or an independent processor of interfaces 210) to perform functions relating to the techniques described herein, e.g., in conjunction with routing process 248. For example, the techniques herein may be treated as extensions to conventional protocols, such as the various PLC protocols or wireless communication protocols, and as such, may be processed by similar components understood in the art that execute those protocols, accordingly.

Figure 4A:
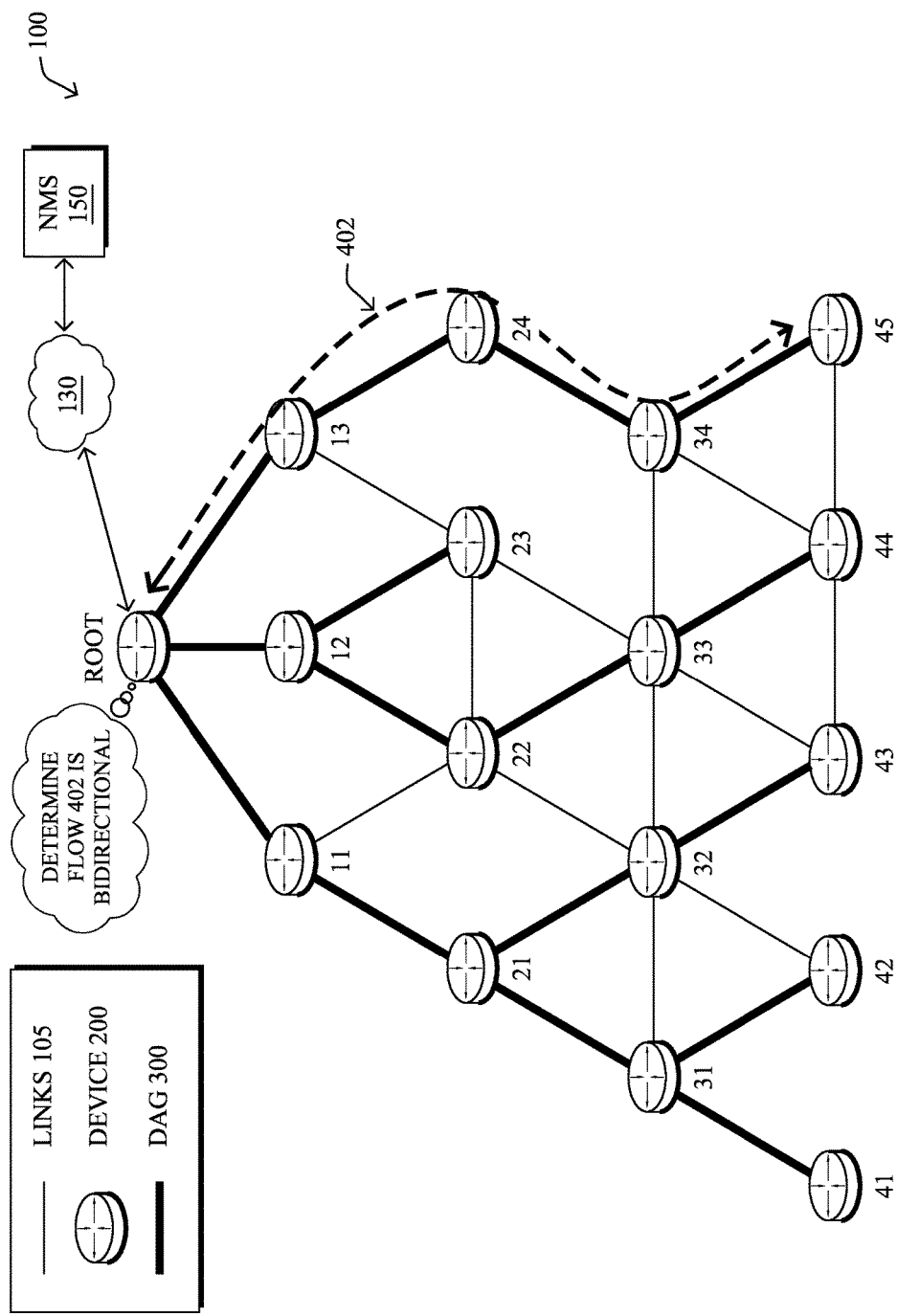

Operationally, a network device may be configured to dynamically detect bidirectional flows. For example, as shown in FIG. 4A, assume that node 45 sends messages to another node/device and receives responses from that node/device, as part of a bidirectional traffic flow 402. In the upward direction, traffic in flow 402 may originate from note 45 and traverse up DAG 300 through nodes 34, 24, 13, and the Root device, respectively. Conversely, traffic in bidirectional traffic flow 402 may also flow in the opposite/downward direction back towards node 45 along the same path. According to various embodiments, the Root node and/or any intermediary nodes (e.g., nodes 34, 24, 13, etc.) along the path traversed by bidirectional traffic flow 402 may be configured to determine that traffic flow 402 is bidirectional.

A network device may detect a bidirectional traffic flow in any number of ways. In some cases, a network device may identify bidirectional flows based on the source and destination of an IPv6 packet. Note, however, that Smart Grid AMI applications typically involve LLN devices communicating with backend servers (e.g., NMS 150, etc.). As a result, traffic flows in the LLN typically flow through a border router (e.g., the Root node shown) that connects the LLN to the WAN (e.g., WAN 130). In other words, the other endpoint of bidirectional traffic flow 402 shown may sometimes be NMS 150 or another device located outside of the local mesh. However, in other cases, bidirectional flows may be identified based on packets flowing between a mesh device and a border router/root node. For example, a mesh device may send packets to a first device, but receive response packets in the reverse direction from a second device, with both devices located behind the border router. In this case, the border router/root node may identify that the packets are being sent in both directions across the mesh for a given node. For example, the Root node shown may correlate outgoing traffic sent by node 45 with one or more traffic flows received by node 45 along the same path, regardless of whether the source and destination devices at the opposite end of traffic flow 402 from that of node 45 are the same.

In another embodiment, network nodes may provide reports to the device (e.g., using CoAP templates, etc.) that specify which flow or flows are bidirectional (e.g., according to the port numbers used by the traffic, the applications associated with the traffic, etc.). For example, the Root device may identify traffic flow 402 as bidirectional based on the addresses and ports used by node 45 and by the corresponding device(s) on the other end of traffic flow 402.

In another embodiment, an application sending a message may explicitly indicate that a traffic flow is bidirectional. For example, as shown in FIG. 4B, assume that an application executed by node 45 expects to exchange a number of packets with a given peer. In such a case, node 45 may explicitly provide an indication to the Root node that the traffic exchanged between node 45 and the peer node is bidirectional. Such an indication may be included within the traffic itself (e.g., as one or more message parameters) or may be sent separately to the Root device.

Figure 4C:
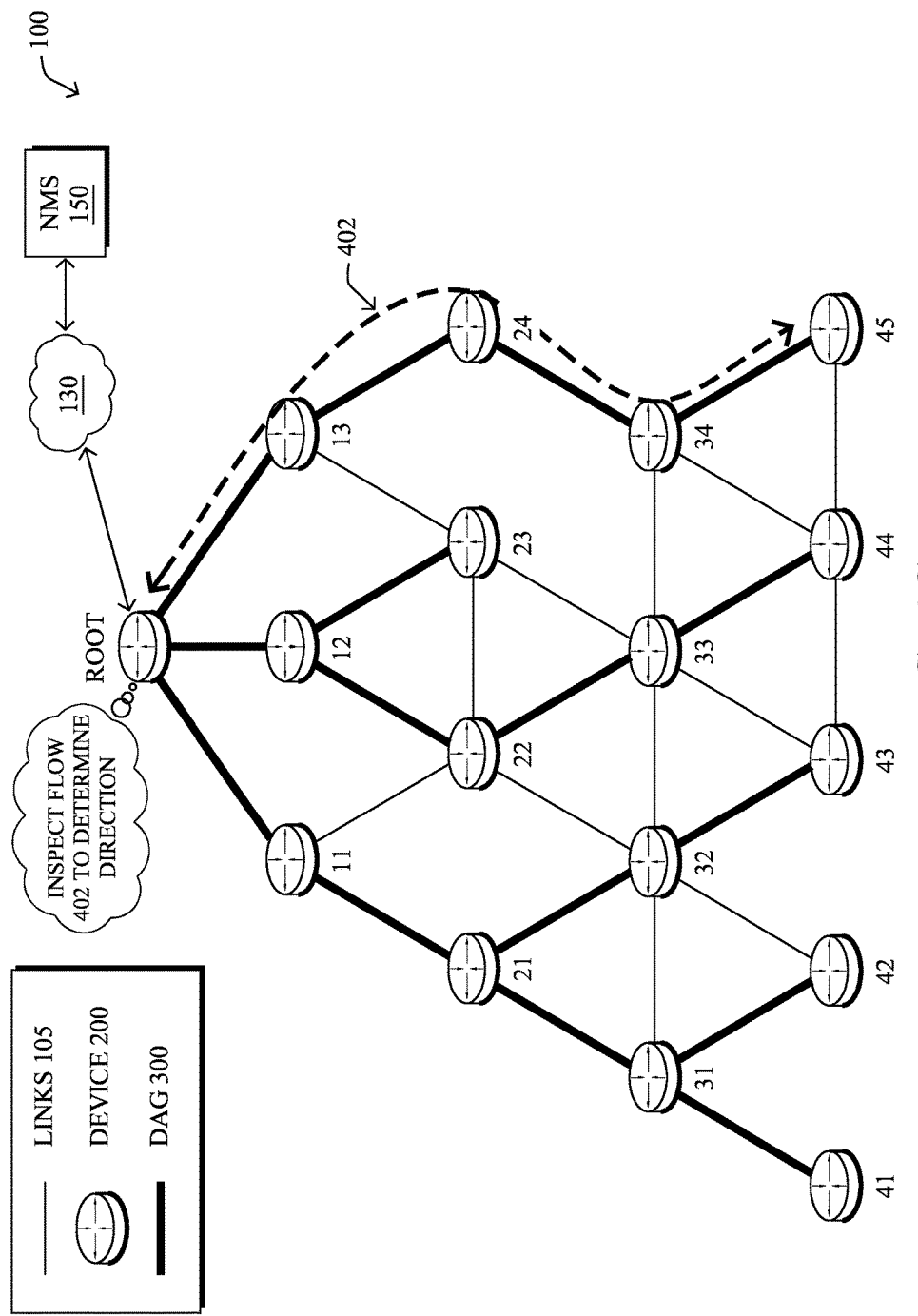

In another embodiment, a network device may detect a bidirectional traffic flow at the network layer by observing traffic being sent/received by the device. For example, as shown in FIG. 4C, the Root device or another device associated with the network path traversed by traffic flow 402 may inspect traffic flow 402, to determine that flow 402 is bidirectional. In response to detecting the presence of a new flow (e.g., using deep packet inspection or a similar technique), the network device may start a timer, to time how long it takes for a packet to be received in response to the inspected packet. If no packets are received for the flow within a given period of time, the network device may deem the flow as unidirectional. However, if the device observes packets for the flow in both directions within a threshold amount of time, the network device may determine that the flow is bidirectional (e.g., as determined by the destination of the traffic, the type of application that generated the traffic, the content of the packets, etc.). In another embodiment, the device may determine that a given traffic flow is bidirectional based on a ratio of the amount of traffic flowing in one direction to the amount of traffic flowing in the opposite direction. For example, if the ratio is 1:1, the device may determine that the flow is bidirectional. However, if the ratio is 100:1, the device may determine that the flow is unidirectional, for purposes of the techniques herein. In other words, the device may compare the traffic ratio in both directions to a threshold parameter, to determine whether or not the flow is bidirectional.

In response to the detection of a bidirectional flow, a network device may optionally convey the information to other nodes or, alternatively, to an NMS. For example, the network device that determines that traffic flow 402 is bidirectional may notify any of the other nodes/devices in network 100 or NMS 150. In other words, any of the devices shown may detect a bidirectional traffic flow and alert one or more other devices to the presence of the flow.

As noted previously, bidirectional traffic along a network path may cause a self-interference condition to exist along the path. In such a case, the traffic flow may be split such that the traffic in one direction is routed along a first path and the corresponding traffic in the opposite direction is routed along a partially or fully diverse path from that of the first path. In various cases, the bidirectional flow may be divided either in response to detecting actual self-interference or, alternatively, in response to determining that a self-interference condition is likely to occur. For example, a network device may determine that a self-interference condition is likely to exist along a path, if the observed time between sent and returned packets flowing in opposite directions along the path is below a time threshold. If the observed time between packets flowing in opposite directions is above the threshold, the device may not cause the flow to be divided (e.g., the device may not treat the flow as "bidirectional" for purposes of the optimization techniques described herein).

Figure 5A:
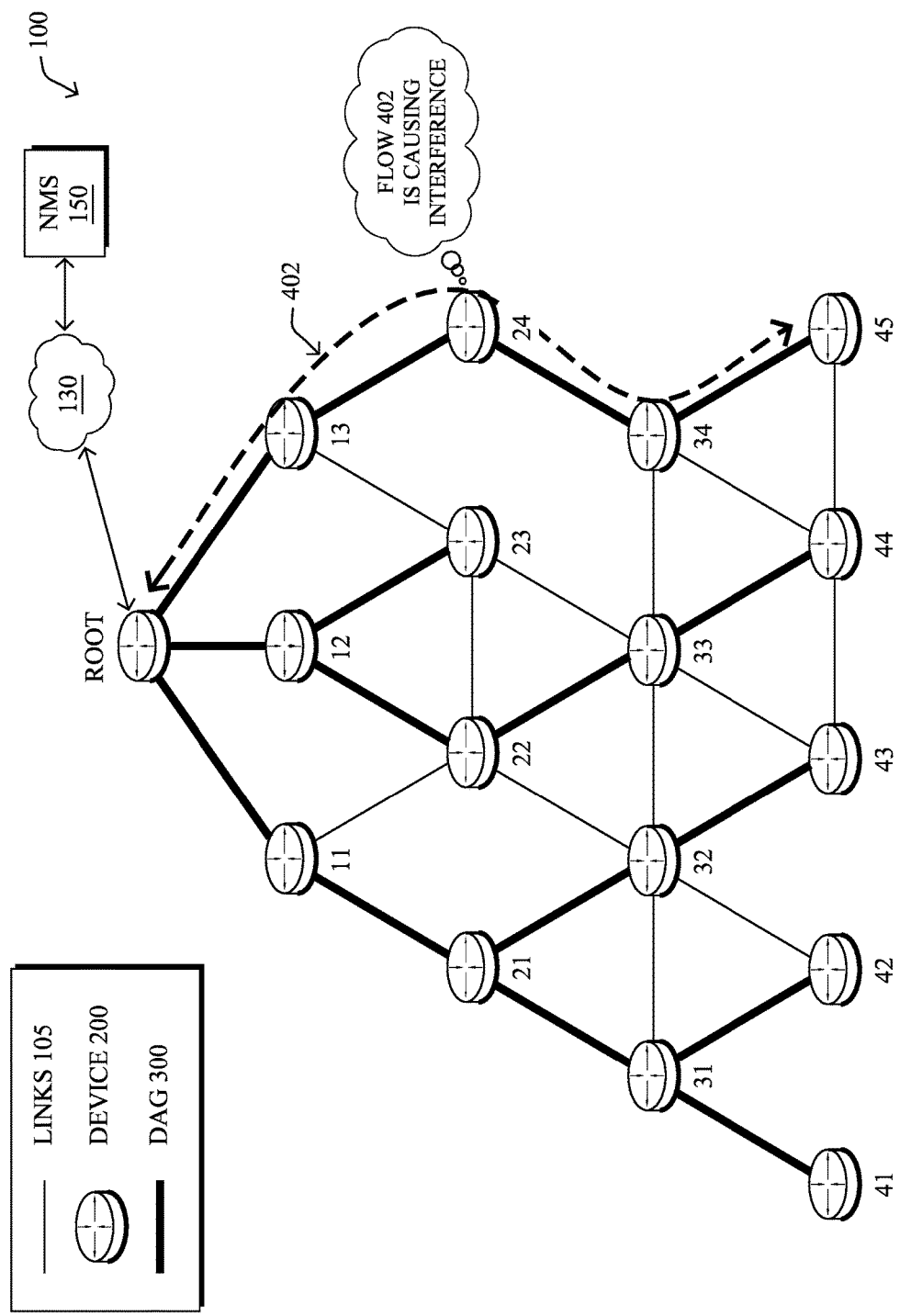
FIGS. 5A-5B illustrate an example of an intermediary device along a network path detecting a self-interference condition.
Figure 5B:
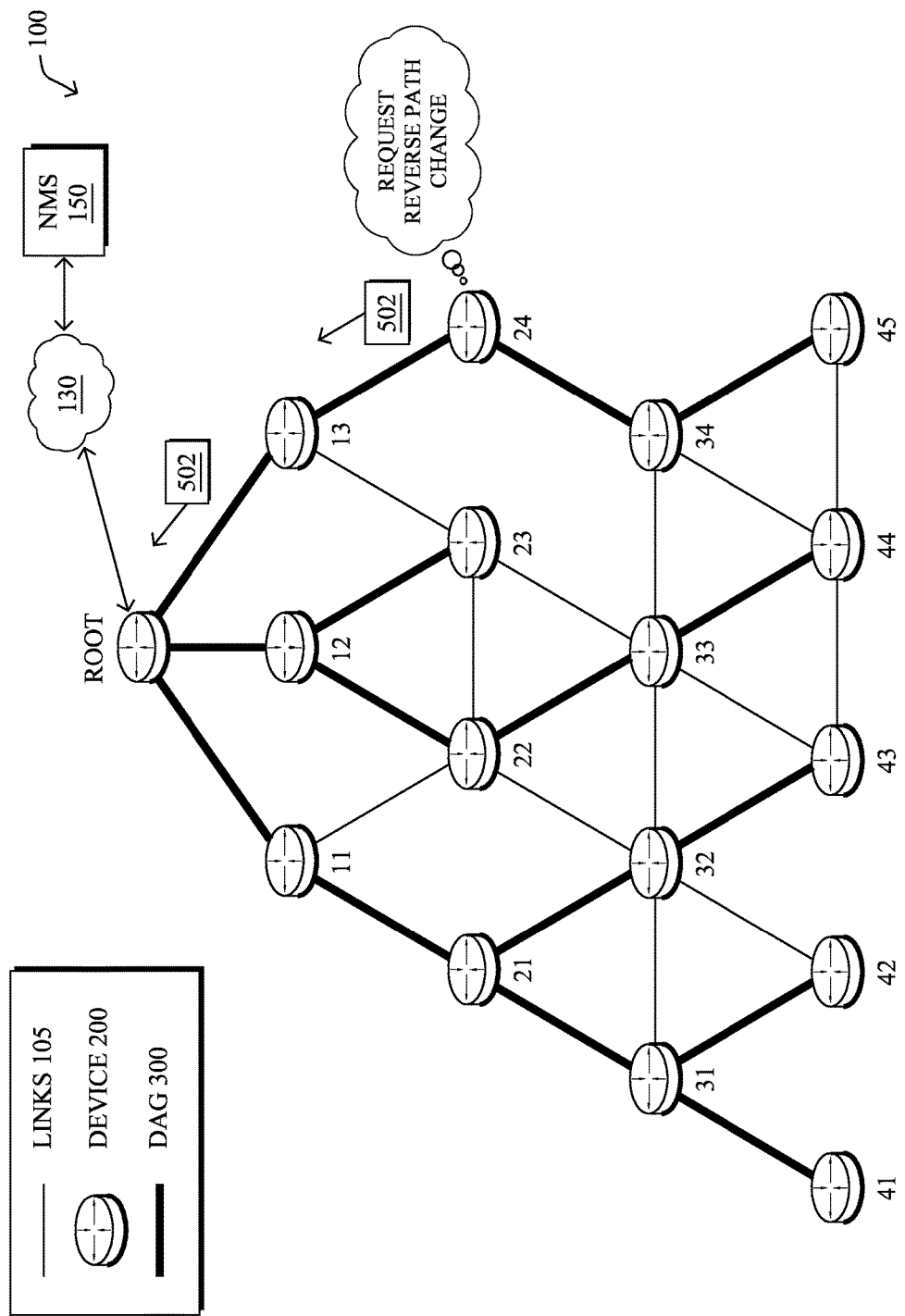

In some cases, an intermediary node along a network path may be configured to determine when a bidirectional traffic flow should be split. For example, as shown in FIG. 5A, an intermediary node (e.g., node 24, the Root node, etc.) along the path traversed by traffic flow 402 may determine whether self-interference is occurring (e.g., by detecting packet collisions). If self-interference is occurring, the LLN device may then perform deep packet inspection, to determine whether the self-interference is due to a bidirectional traffic flow. For example, as shown in FIG. 5B, node 24, the Root node, or another node along the path used by bidirectional traffic flow 402, may send a notification 502 to one or both devices located at the end of the network path. In response to receiving notification 502, the endpoint device may begin routing traffic to the other endpoint device using an alternate path. For example, an intermediary device that determines that a self-interference condition exists due to a bidirectional traffic flow may mark the corresponding traffic causing the condition by setting a bit in the packet (e.g., in a manner similar to setting the ECN bit in an IP packet). This new bit may then be used by one of the endpoint nodes to start using an alternate path in the reverse direction.

Figure 6A:
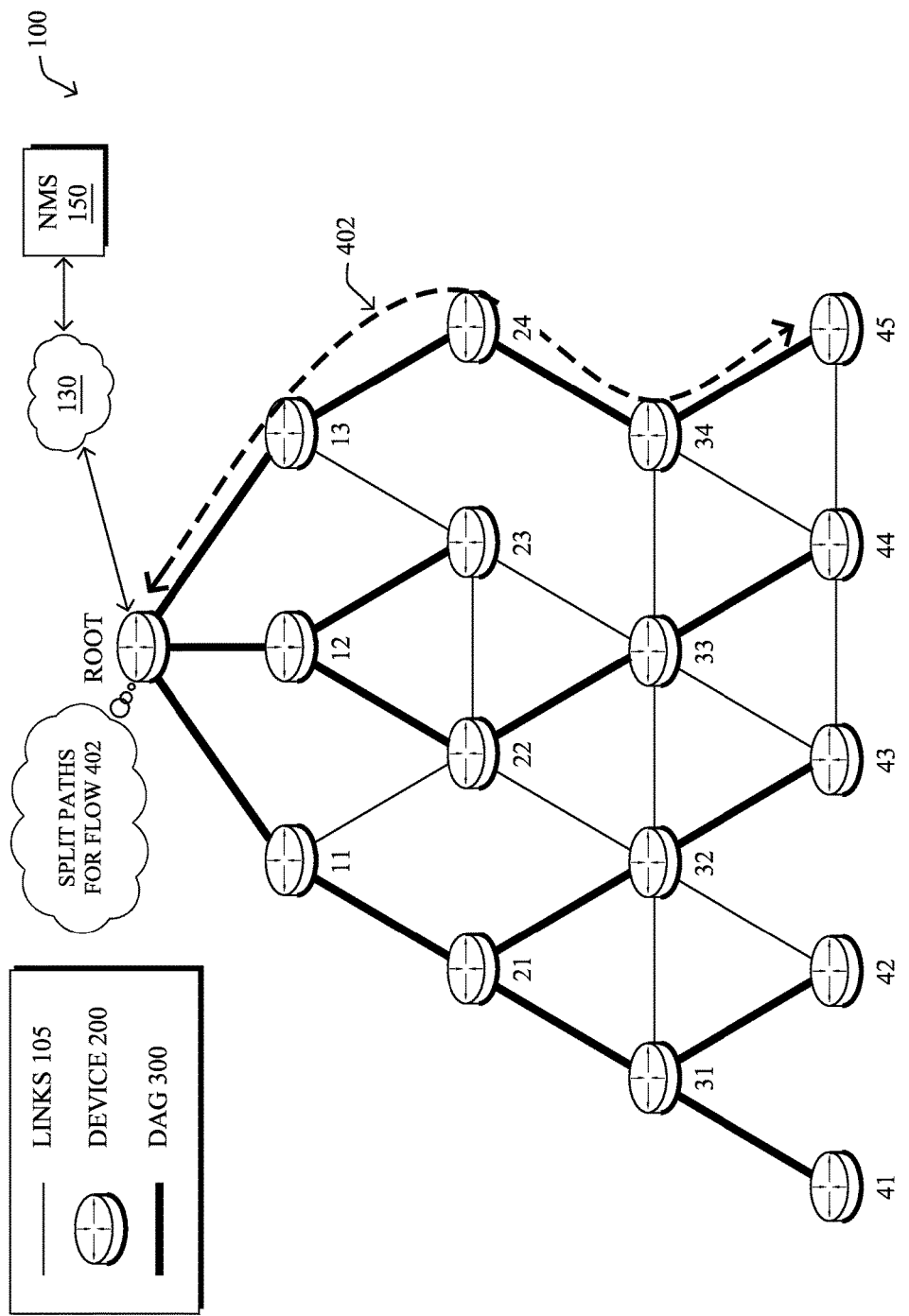
FIGS. 6A-6C illustrate examples of a network device causing a bidirectional traffic flow to use different network paths.
Figure 6B:
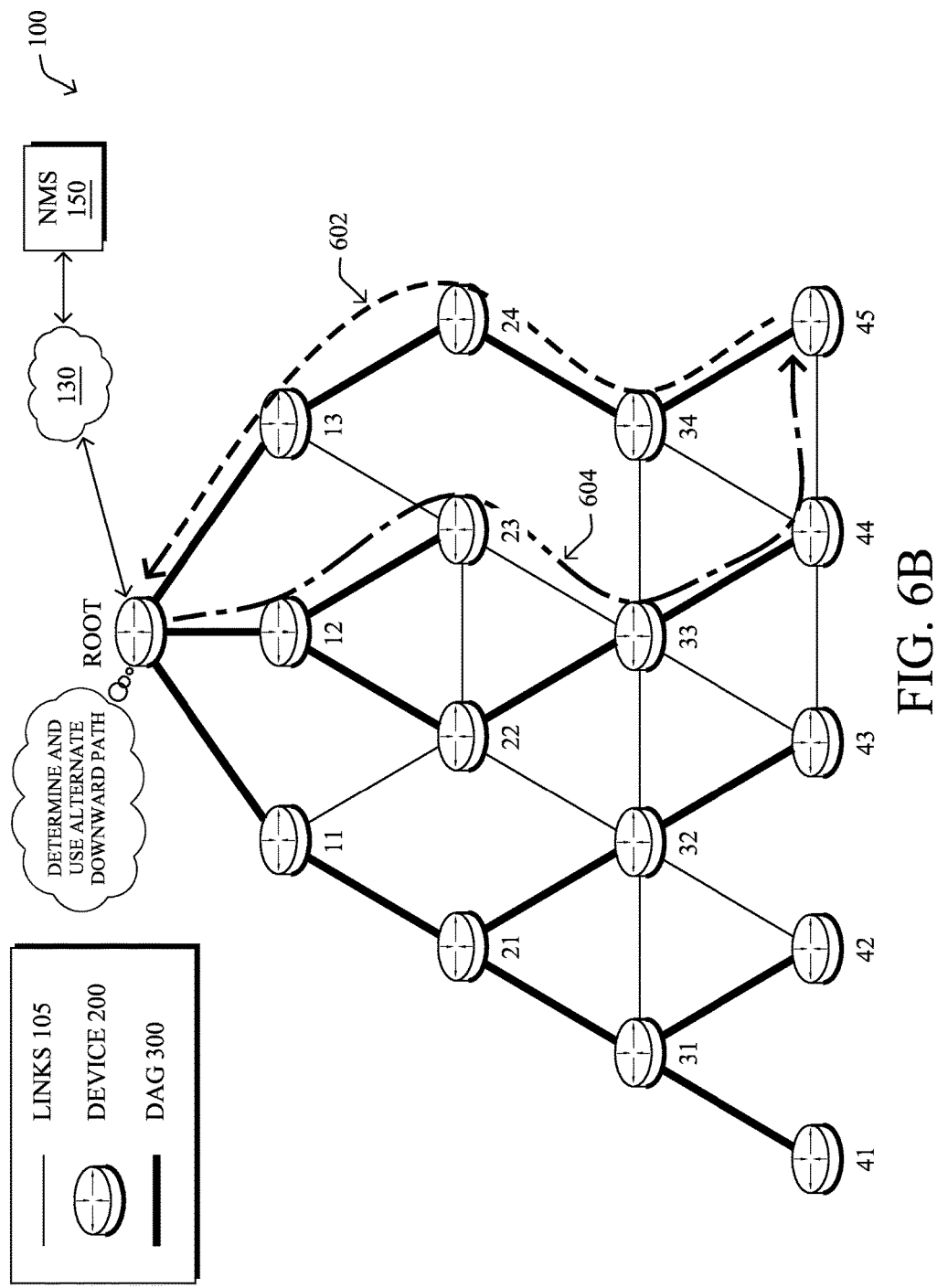
Figure 6C:
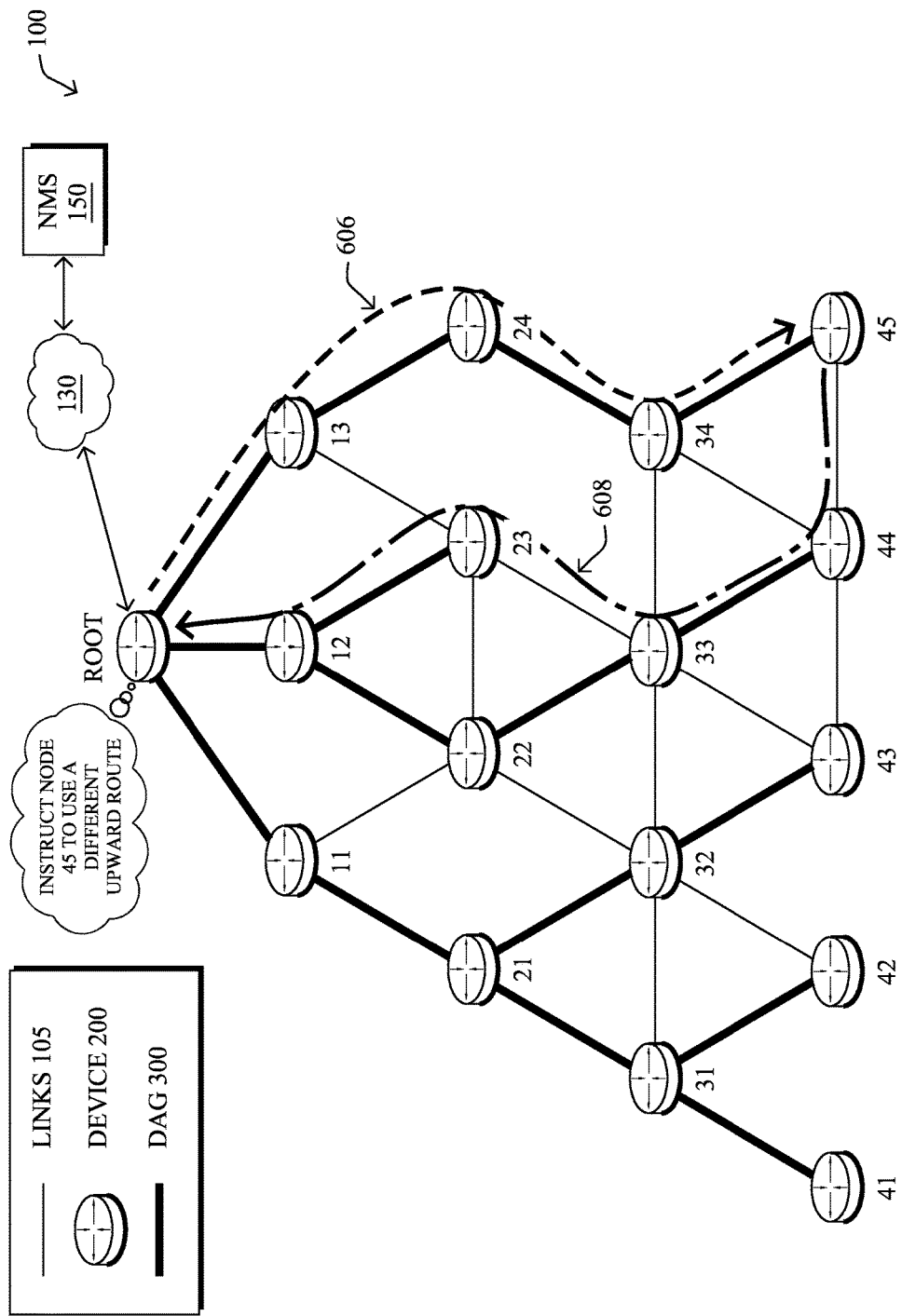

In one embodiment, the endpoint devices of a traffic flow may already have information about the traversed path, such as when the network uses a routing protocol like RPL in non-storing mode. For example, as shown in FIG. 6A, when the Root node/border router receives notification 502 (e.g., one or more packets with a bit set to trigger the splitting of the traffic flow), the Root node may begin computing source routes that are likely asymmetric in the reverse direction. In particular, the Root node may generate source routes that do not make use of the preferred parent links along the path. For example, as shown in FIG. 6B, the Root node may compute a source route with node 45 that does not make use of the preferred parent links along the primary path (e.g., traffic from flow 402 sent in the downward direction is routed via route 604 and in the upward direction via route 602). Consequently, the likelihood of using the same links in both directions is decreased and results in an asymmetric path between the upward route and the downward route. In the reverse direction, the source route itself provides the path being used in the downward direction, allowing node to signal the use of alternate paths in the upward direction. For example, as shown in FIG. 6C, the Root node may instead opt to use a downward path that includes the preferred parent links and instruct node 45 to use an alternate path in the upward direction (e.g., by instructing node 45 to use a non-preferred parent). In such a case, node 45 may instead route traffic in the upward direction along path 608, while the Root device sends traffic in the opposite direction to node 45 along path 606.

In one embodiment, a device may simply set a bit to indicate the use of alternate parents (e.g., when the downward path is utilizing preferred parents). In another embodiment, the device may include a representation of the source route (e.g., explicit entries, using a Bloom filter, etc.), to indicate what parents not to use in the upward direction. In either case, the end result is an upward path for a bidirectional traffic flow that differs from the downward path used by the flow. In other words, the bidirectional traffic flow may be split such that asymmetric routes are used to route the traffic in different directions.

Figure 7A:
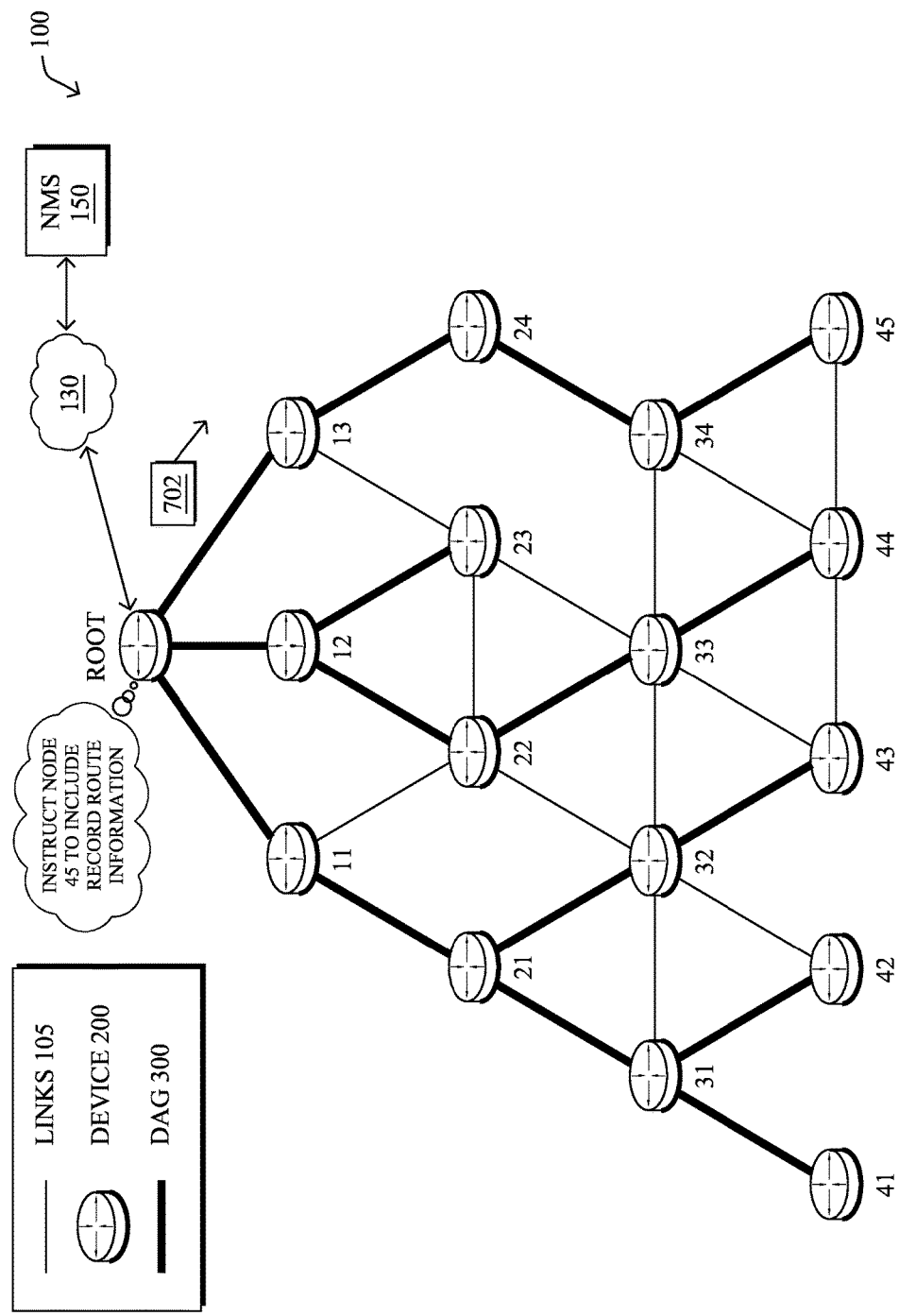
FIGS. 7A-7B illustrate examples of a record-route mechanism being initiated along a network path.

In some implementations, the network may use a routing protocol that does not readily provide path information. In such cases, network devices may be configured to use a different mechanism to obtain information about the traversed path. In one embodiment, one or more devices along a network path may use a record-route mechanism, to obtain information regarding the network path. For example, as shown in FIG. 7A, if the Root device hosts an agent that identifies bidirectional flows (e.g., bidirectional flow process 247), the Root device may send an instruction 702 to node 45, or any other of nodes 11-45, to include record route information in packets sent by the node. For example, in response to receiving instruction 702, node 45 may include a record-route header within a message originated by node 45. Intermediary nodes along the path (e.g., nodes 34, 24, 13, etc.) may then add to this header with data regarding their identities, thereby allowing the Root node to determine the path traversed by the message.

A network node may be instructed to use a route-record mechanism under various circumstances. In some cases, the node may be instructed to begin using the route-record mechanism based on the likelihood of a self-interference condition occurring. For example, the Root node may not instruct node 45 to include record-route information if the packets within a given traffic flow are forwarded with a sufficient time gap. In such cases, self-interference is not likely to occur and the path traversed by the traffic may not be divided. In another example, an intermediary node along a path that has changed may provide an instruction to include record-route information, to allow the Root device to update its downward route.

Figure 7B:
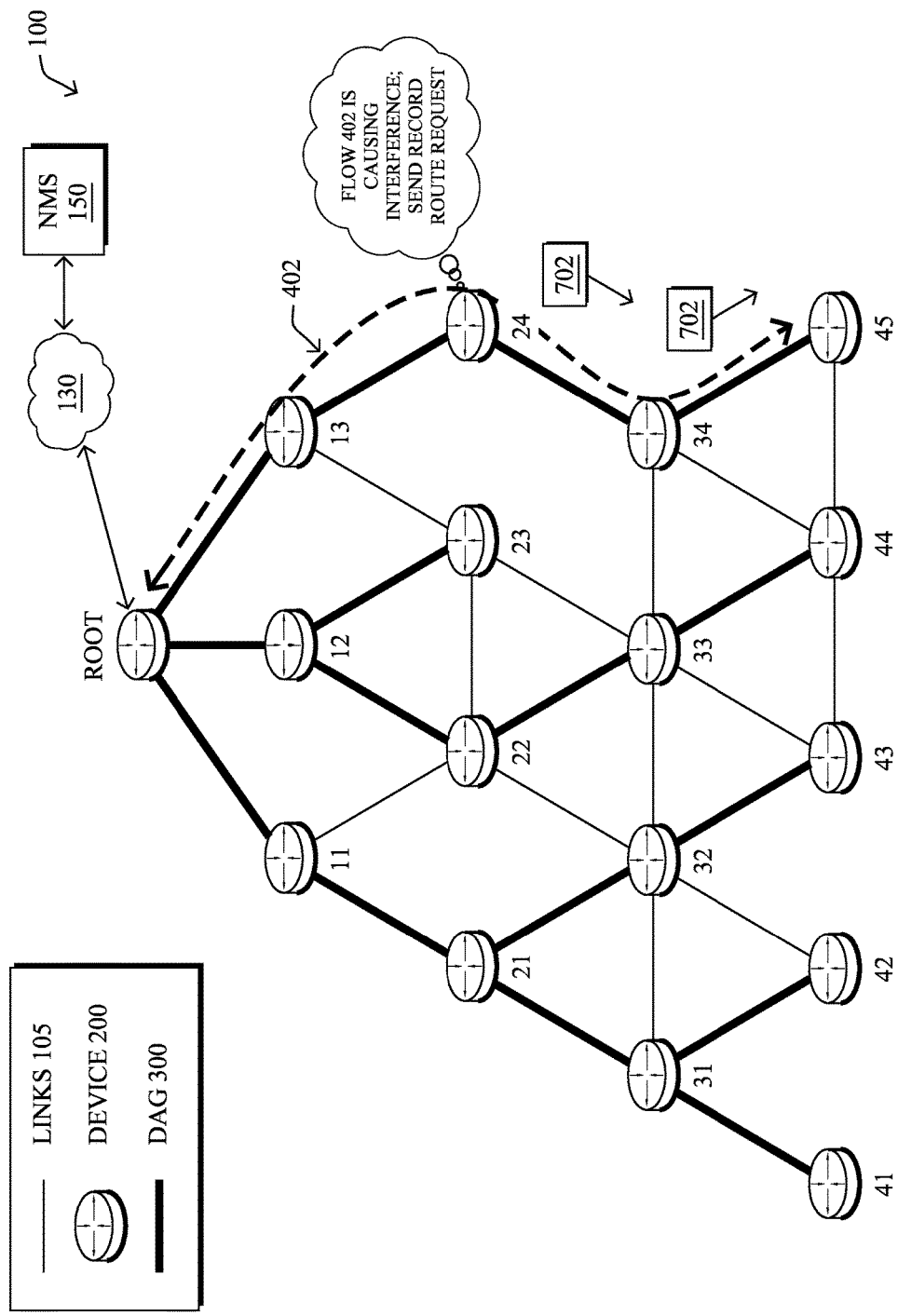

In some cases, a record-route mechanism may be initiated by a device, in response to the device determining that self-interference is occurring. For example, as shown in FIG. 7B, intermediary node 24 or another node along the path traversed by traffic flow 402 may determine that traffic flow 402 is causing self-interference. For example, if the link-layer determines that collisions are becoming more frequent and node 24 is forwarding packets in both directions as part of traffic flow 402, node 24 may send instruction 702 to node 45 to include record-route information.

In one embodiment, instruction 702 used to initiate the use of a record-route mechanism may be sent to a mesh device as an explicit message. In another embodiment, instruction 702 may be piggybacked on packets that are already being sent back to the mesh device (e.g., as part of traffic flow 402 flowing back to node 45). As would be appreciated, the embodiments herein that use a record-route mechanism contrast with other approaches where diverse paths are computed either simultaneously (e.g. using the Bhandari algorithm) or one at a time (e.g., by recording the route of a first path and then pruning the traversed network element of a database to compute a diverse path). In addition, the partially or fully diverse path calculated herein is related to the opposite direction of a path between a pair of nodes, in contrast to other techniques that merely seek to determine a backup/alternate route in the forward direction.

Figure 8:
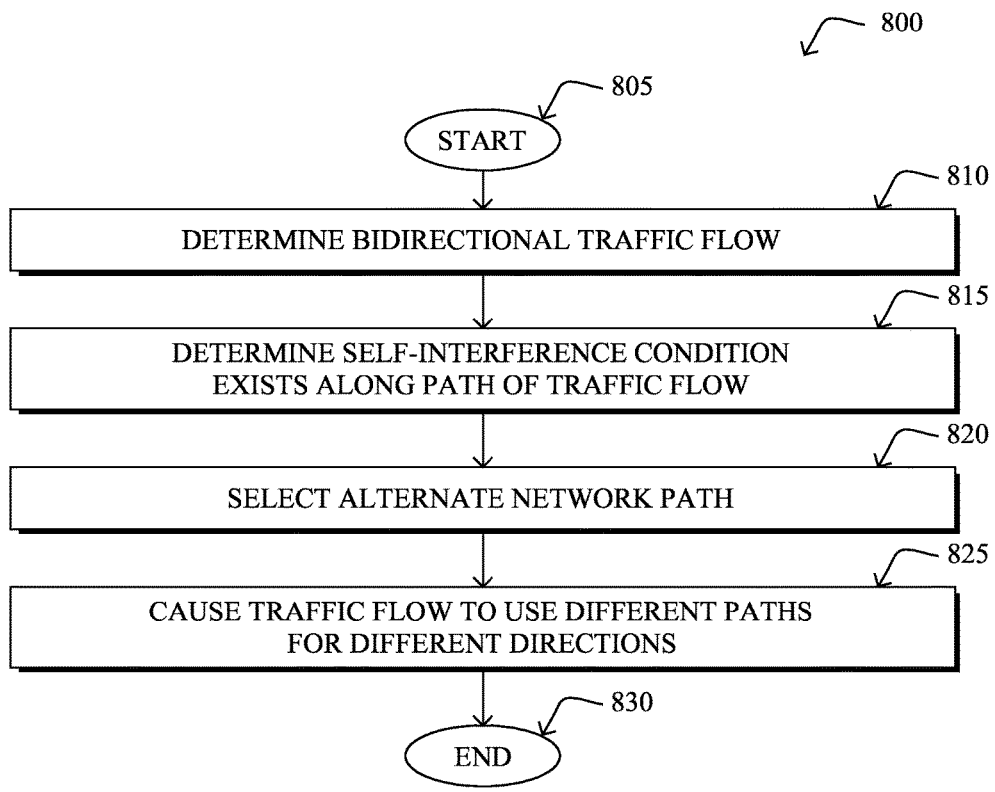
FIG. 8 illustrates an example simplified procedure for optimizing a bidirectional traffic flow.

FIG. 8 illustrates an example simplified procedure for optimizing a bidirectional traffic flow, in accordance with one or more embodiments described herein. The procedure 800 may start at step 805, and continues to step 810, where, as described in greater detail above, a network device (e.g., device 200, such as a root node/border router of a network, an intermediary node along a network path, etc.), detects a bidirectional traffic flow. In one embodiment, the device may receive an indication from one or more network nodes associated with the traffic flow that the traffic is bidirectional. For example, a particular application may indicate that a message sent to a remote device is expected to be part of a bidirectional exchange of data. In another embodiment, the device may detect a bidirectional traffic flow by analyzing the header and/or payload information within packets of the traffic flow. For example, the device may analyze the addresses, ports, applications, etc. associated with the packets, to determine that the traffic flow is bidirectional (e.g., by comparing this information to CoAP templates, etc.). In yet another embodiment, the network device may perform deep packet inspection on packets of the traffic flow, to analyze the payload of the packets of the flow and determine that the flow is bidirectional. In a further embodiment, the device may determine whether a traffic flow is bidirectional by comparing a ratio of traffic in opposing directions to a threshold value (e.g., to determine whether the volume of traffic flowing in both directions is approximately equal).

At step 815, the network device determines that a self-interference condition exists along the path of the bidirectional traffic flow, as described in greater detail above. In various cases, the self-interference condition may be an actual interference condition (e.g., detected) or a likely self-interference condition. In one embodiment, the network device may receive an indication from a node along the path that self-interference is occurring. For example, the network device may receive an indication from an intermediary node along the path that the intermediary node is experiencing excessive packet collisions. The network device may also detect a self-interference condition itself, in a similar manner. In other embodiments, the network device may detect a likely self-interference condition based on the time difference between packets in the traffic flow that are traveling in opposite directions.

At step 820, the network device selects an alternate path that differs from the primary path used by the bidirectional traffic flow, as highlighted above. In various cases, the alternate path may be partially or fully diverse from that of the primary path. In other words, the alternate path may be selected to include one or more preferred parent nodes along the primary path (e.g., at least a portion of the paths overlap) or to exclude all of the nodes along the primary path. In one embodiment, the network device may use path information obtained via the routing protocol used in the network (e.g., RPL, etc.), to select the alternate path. In another embodiment, the network device may instruct one or more nodes in the network (e.g., an endpoint node of the path, etc.), to begin using a record-route mechanism. Such a mechanism may be used to record path information as packets are routed in the network, thereby allowing the network device to obtain information regarding the primary path. The network device may then use this information to select an alternate path that differs from the primary path.

At step 825, as described in greater detail above, the network device causes the traffic flow to use the primary path for packets of the traffic flow sent in a first direction and to use the alternate path for packets of the traffic flow send in a second direction that is opposite that of the first direction. In one embodiment, the network device may receive packets from an endpoint network node via the primary path and use the alternate path to route packets flowing in the opposite direction (e.g., back towards the network node). In another embodiment, the network device may instruct the endpoint node to send packets via the alternate path (e.g., by instructing the endpoint node to use a non-preferred parent). In either case, packets of the bidirectional traffic flow may be routed in one direction along the primary path and in the opposite direction along the alternate path. In further embodiments, two alternate paths may be used, in lieu of using the primary path and an alternate path. However, as would be appreciated, the primary path is typically the optimal path, as determined by the routing protocol. Procedure 800 then ends at a step 830.

Figure 9:
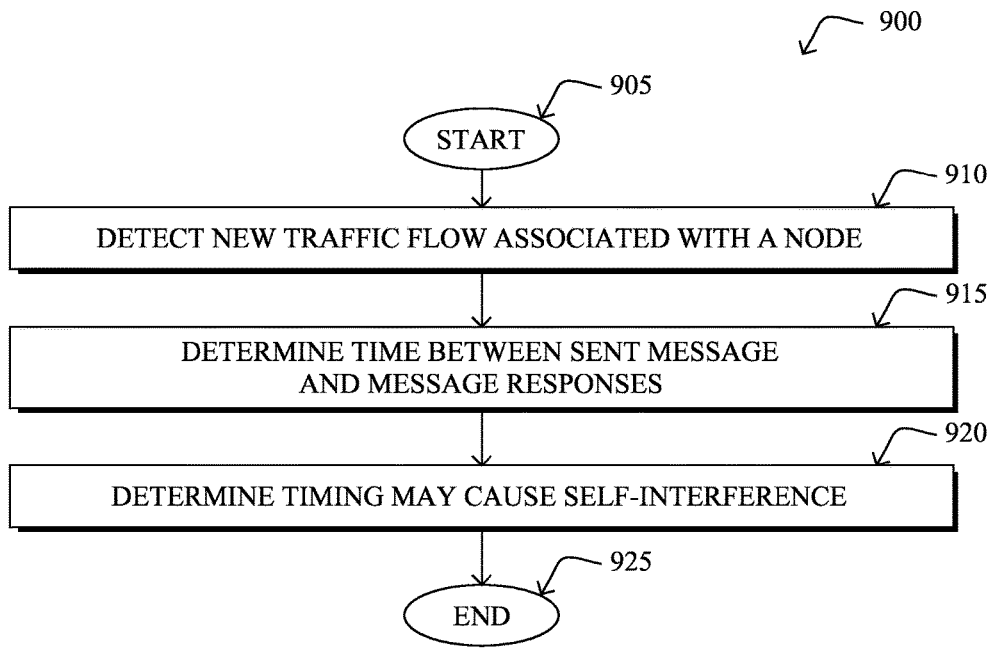
FIG. 9 illustrates an example simplified procedure for determining the existence of a self-interference condition along a network path.

FIG. 9 illustrates an example simplified procedure for determining the existence of a self-interference condition along a network path, in accordance with one or more embodiments described herein. The procedure 900 may start at step 905, and continues to step 910, where, as described in greater detail above, a network device (e.g., device 200, such as a root node/border router of a network, an intermediary node along a network path, etc.), detects a new traffic flow associated with a network node. For example, the device may perform deep packet inspection on a packet to be forwarded by the device along a path and sent by an endpoint node of the path.

At step 915, as described in greater detail above, the network device determines an amount of time between related packets that are sent to and from the endpoint node. For example, assume that the endpoint node sends a request message that is routed along a path to another endpoint node. In response to the request, the other endpoint node may send one or more response messages back to the first endpoint node. In such a case, the network device through which the requests and responses are routed may determine the amount of time between the requests and responses. It should be noted that in other implementations, a response may also be sent by a different node than the node that received the request message.

At step 920, the network device determines that the amount of time determined in step 915 is likely to cause a self-interference condition along the network path, as detailed above. Such a condition may result, for example, if an intermediary node along the network path traversed by the traffic flow attempts to forward a packet in one direction at the same time that another intermediary node attempts to forward packet to it in the opposite direction. However, if the amount of time between packets flowing in the opposite directions is beyond a defined time threshold, self-interference may not occur. Procedure 900 then ends at a step 925.

Figure 10:
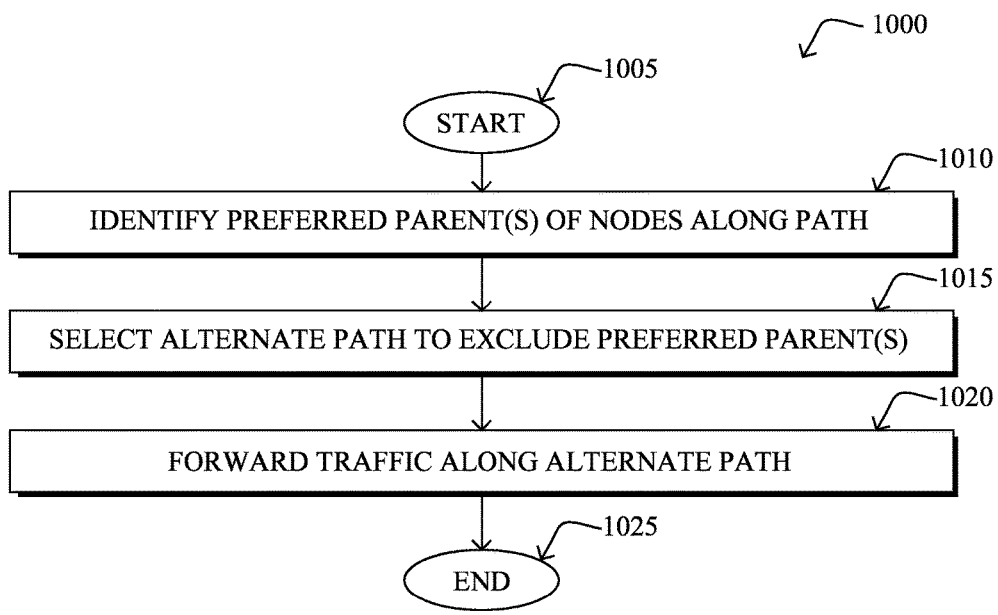
FIG. 10 illustrates an example simplified procedure for determining an alternate path for a bidirectional traffic flow.

FIG. 10 illustrates an example simplified procedure for determining an alternate path for a bidirectional traffic flow, in accordance with one or more embodiments described herein. The procedure 1000 may start at step 1005, and continues to step 1010, where, as described in greater detail above, a network device (e.g., device 200, such as a root node/border router of a network, an intermediary node along a network path, etc.), the network device identifies one or more preferred parent nodes along a network path. In general, a preferred parent of a node may be selected in conjunction with an objective function used by the routing protocol. For example, a preferred parent of a node may be selected based on the characteristics of the link between the preferred parent and the node (e.g., signal strength, packet loss, jitter, latency, etc.), metrics along a path that includes the link (e.g., the number of hops to a border router/root node, etc.), or any other such characteristics. In some embodiments, the network node identifies the one or more parent nodes via the routing protocol itself such as, e.g., when using RPL in non-storing mode. In further embodiments, the network device may identify the one or more parent nodes along the path using a record-route mechanism that records information about the hops traversed along the path.

At step 1015, as described in greater detail above, the network device selects an alternate path that excludes one or more of the identified parent nodes. In some cases, the network device may select the alternate path to be partially diverse from that of the path (e.g., by excluding only a subset of the parent nodes along the path). In other cases, the network device may select the alternate path to be fully diverse from that of the path by excluding all of the preferred parent nodes from the alternate path.

At step 1020, as detailed above, the device forwards traffic along the alternate path selected in step 1015. For example, a FAR/Root node of the network may receive packets of the traffic flow sent in the upward direction via the primary path and send corresponding packets of the flow in the downward direction via the selected alternate path. Procedure 1000 then ends at a step 1025.

It should be noted that while certain steps within procedures 800-1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

The techniques described herein, therefore, provide for the optimization of bidirectional traffic flows in networks such as, e.g., Smart Grid AMI networks. Notably, using non-overlapping paths in each direction of a bidirectional traffic flow minimizes self-interference, significantly improving the overall capacity, throughput, latency, and robustness of large-scale mesh networks.

While there have been shown and described illustrative embodiments that provide for optimizing bidirectional traffic flows in a shared-media communication network, it is to be understood that various other adaptations and modifications may be made within the spirit and scope of the embodiments herein. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting, by a device in Low power and Lossy network (LLN), a bidirectional traffic flow along a primary path in the LLN;
    determining, by the device, that a self-interference condition exists along the primary path, wherein self-interference is an interference between two devices, both attempting to use a same frequency, in a same physical location in the LLN; and
    in response to determining that the self-interference condition exists:
        selecting, by the device, an alternate path in the LLN, and
        causing, by the device, the bidirectional traffic flow to use the primary path for packets of the bidirectional traffic flow sent in a first direction and to use the alternate path for packets of the bidirectional traffic flow sent in a second direction that is opposite that of the first direction.

2. The method as in claim 1, wherein detecting the bidirectional traffic flow along the primary path comprises:
    receiving, at the device, an indication that the bidirectional traffic flow is bidirectional from one or more nodes along the primary path.

3. The method as in claim 1, wherein detecting the bidirectional traffic flow along the primary path comprises:
    performing, by the device, deep packet inspection on packets of the bidirectional traffic flow to detect a new traffic flow.

4. The method as in claim 1, wherein detecting the bidirectional traffic flow along the primary path comprises:
    determining, by the device, a ratio of traffic flow of the bidirectional traffic flow flowing in the first direction to that of the second direction; and
    determining, by the device, that the ratio is below a threshold ratio.

5. The method as in claim 1, wherein determining that the self-interference condition exists along the primary path comprises:
    detecting, by the device, a new flow of traffic associated with an endpoint node of the primary path;
    determining, by the device, an amount of time between one or more sent messages and one or more response messages in the new flow of traffic; and
    determining, by the device, that the amount of time is likely to result in the self-interference condition.

6. The method as in claim 1, wherein determining that the self-interference condition exists along the primary path comprises:
    receiving, at the device, an indication from an intermediary node along the primary path that the self-interference condition exists.

7. The method as in claim 1, wherein the alternate path is selected based on a record-route mechanism used along the primary path.

8. The method as in claim 1, wherein selecting the alternate path comprises:
    identifying, by the device, one or more preferred parent nodes for one or more nodes along the primary path; and
    selecting, by the device, the alternate path to exclude the one or more preferred parent nodes.

9. The method as in claim 8, wherein causing the bidirectional traffic flow to use the primary path for packets of the bidirectional traffic flow sent in a first direction and to use the alternate path for packets of the bidirectional traffic flow sent in a second direction that is opposite that of the first direction comprises:
    forwarding, by the device, traffic in the second direction along the alternate path.

10. The method as in claim 1, wherein causing the bidirectional traffic flow to use the primary path for packets of the bidirectional traffic flow sent in a first direction and to use the alternate path for packets of the bidirectional traffic flow sent in a second direction that is opposite that of the first direction comprises:
    instructing, by the device, a node along the primary path to forward traffic in the first direction to a non-preferred parent of the node.

11. An apparatus, comprising:
    one or more network interfaces to communicate with a Low power and Lossy network;
    a processor coupled to the one or more network interfaces and configured to execute one or more processes; and
    a memory configured to store a process executable by the processor, the process when executed operable to:
        detect a bidirectional traffic flow along a primary path in the LLN;
        determine that a self-interference condition exists along the primary path, wherein self-interference is an interference between two devices, both attempting to use a same frequency in a same physical location in the LLN; and in response to determining that the self-interference condition exists:
select an alternate path in the LLN, and
cause the bidirectional traffic flow to use the primary path for packets of the bidirectional traffic flow sent in a first direction and to use the alternate path for packets of the bidirectional traffic flow sent in a second direction that is opposite that of the first direction.

12. The apparatus as in claim 11, wherein the apparatus detects the bidirectional traffic flow along the primary path by:
receiving an indication that the bidirectional traffic flow is bidirectional from one or more nodes along the primary path.

13. The apparatus as in claim 11, wherein the apparatus determines that the self-interference condition exists along the primary path by:
performing deep packet inspection on packets of the bidirectional traffic flow to identify a new traffic flow.

14. The apparatus as in claim 11, wherein the apparatus detects the bidirectional traffic flow along the primary path by:
determining a ratio of traffic flow of the bidirectional traffic flow flowing in the first direction to that of the second direction; and
determining that the ratio is below a threshold ratio.

15. The apparatus as in claim 11, wherein the apparatus determines that the self-interference condition exists along the primary path by:
detecting a new flow of traffic associated with an endpoint node of the primary path;
determining an amount of time between one or more sent messages and one or more response messages in the new flow of traffic; and
determining that the amount of time is likely to result in the self-interference condition.

16. The apparatus as in claim 11, wherein the apparatus determines that the self-interference condition exists along the primary path by:
receiving an indication from an intermediary node along the primary path that the self-interference condition exists.

17. The apparatus as in claim 11, wherein the alternate path is selected based on a record-route mechanism used along the primary path.

18. The apparatus as in claim 11, wherein the apparatus selects the alternate path by:
identifying one or more preferred parent nodes for one or more nodes along the primary path; and
selecting the alternate path to exclude the one or more preferred parent nodes.

19. The apparatus as in claim 18, wherein the apparatus causes the bidirectional traffic flow to use the primary path for packets of the bidirectional traffic flow sent in a first direction and to use the alternate path for packets of the bidirectional traffic flow sent in a second direction that is opposite that of the first direction by:
forwarding traffic in the second direction along the alternate path.

20. The apparatus as in claim 11, wherein the apparatus causes the bidirectional traffic flow to use the primary path for packets of the bidirectional traffic flow sent in a first direction and to use the alternate path for packets of the bidirectional traffic flow sent in a second direction that is opposite that of the first direction by:
instructing a node along the primary path to forward traffic in the first direction to a non-preferred parent of the node.

21. A tangible, non-transitory, computer-readable media having software encoded thereon, the software when executed by a processor on a device in a Low power and Lossy network (LLN) operable to:
detect a bidirectional traffic flow along a primary path in the LLN;
determine that a self-interference condition exists along the primary path, wherein self-interference is an interference between two devices, both attempting to use a same frequency, in a same physical location in the LLN; and
in response to determining that the self-interference condition exists:
select an alternate path in the LLN, and
cause the bidirectional traffic flow to use the primary path for packets of the bidirectional traffic flow sent in a first direction and to use the alternate path for packets of the bidirectional traffic flow sent in a second direction that is opposite that of the first direction.

* * * * *